United States Patent [19]
Klotmann et al.

[11] 3,759,929
[45] Sept. 18, 1973

[54] MANUFACTURE OF β-HYDROXY CARBONYL COMPOUNDS AND/OR α-UNSATURATED CARBONYL COMPOUNDS

[75] Inventors: Georg Klotmann, Ludwigshafen; Herbert Mueller, Frankenthal, both of Germany

[73] Assignee: Badische Anilin & Soda-Fabrik Aktiengesellschaft, Ludwigshafen/Rhein, Germany

[22] Filed: Nov. 2, 1970

[21] Appl. No.: 86,389

[52] U.S. Cl..... 260/293.88, 260/514 R, 260/515 R, 260/526 N, 260/537 N, 260/590
[51] Int. Cl............................................. C07d 29/24
[58] Field of Search.................. 260/293.88, 514 R, 260/515 R, 526 N, 537 N, 590

[56] References Cited
OTHER PUBLICATIONS

Cram et al., Organic Chemistry, 2nd Ed., McGraw-Hill Book Co., New York (1964), pp. 308-12.
L'Aloi–Diard et al., Bull. Soc. Chim. France 1964, 3235.
Morrison et al., Organic Chemistry, 2nd Ed., Allyn and Bacon, Inc., Boston (1966), pp. 867-870.
Ried et al., Chem. Ber. 100, 605-607 (1967).

*Primary Examiner*—Henry R. Jiles
*Assistant Examiner*—G. Thomas Todd
*Attorney*—Johnston, Root, O'Keeffe, Keil, Thompson & Shurtleff

[57] ABSTRACT

The manufacture of β-hydroxy carbonyl compounds and/or α-unsaturated carbonyl compounds by the reaction of ketones with derivatives of glyoxylic acid and derivatives of α-ketoaldehydes in the absence of catalysts at a temperature below 140° C.

Some of the compounds obtainable by the process of the invention are solvents and valuable starting materials for the manufacture of dyes, plastics, adhesives and varnishes.

5 Claims, No Drawings

MANUFACTURE OF β-HYDROXY CARBONYL COMPOUNDS AND/OR α-UNSATURATED CARBONYL COMPOUNDS

This invention relates to a process for the manufacture of β-hydroxy carbonyl compounds and/or α-unsaturated carbonyl compounds by the reaction of ketones with derivatives of glyoxylic acid and derivatives of α-ketoaldehydes in the absence of catalysts at a temperature below 140° C.

It is disclosed in Bulletin de la Societe Chimique de France 1964, pp. 3235 ff., that benzoylacetone may be condensed with glyoxylic acid in the absence of a catalyst to form an unsaturated keto acid. The reaction of aldehydes with β-ketocarboxylic acids under mild conditions is described in Chemische Berichte, Vol. 100 (1967), pp. 605 ff. The 1,3-dioxo compounds and β-keto acids mentioned therein show significant CH-acidity in their middle-position methylene group. The proton of this group is readily shifted even at room temperature so that a considerable portion of the ketones is in equilibrium with the enol form. The literature on aldol condensation also discloses that the reaction proceeds via a carbanion or via the enol from which, in the case of ketones activated for example by carbonyl groups or carboxyl groups, is present even at room temperature in a high concentration (Beyer, Lehrbuch der Organischen Chemie, Hirzel Verlag Leipzig, 1967, pp. 216, 241). U.S. Pat. No. 2,388,086 teaches that ketones may be reacted with glyoxal at elevated temperature in the absence of catalysts to form nonuniform, resinous condensation products. German Patent . . . . . . (Patent Application P 16 43 751.7) describes the reaction of ketones with aldehydes in the absence of catalysts at temperatur of from 140° to 420° C. The preferred temperature range, which is used in all of the Examples, is between 200° and 350° C. At lower temperatures the conversion is unsatisfactory for production on an industrial scale.

Research work reported in Liebigs Annalen der Chemie, Vol. 338, pp. 336 ff., shows that glyoxylic acid disproportionates on heating above its melting point to oxalic acid and glycolic acid.

It is an object of this invention to provide a new process for the manufacture of carbonyl compounds in good yield and purity.

This and other objects are achieved and the production of β-hydroxy carbonyl compounds and/or α-unsaturated carbonyl compounds by the reaction of ketones containing one keto group or a number of keto groups each of which is separated from the adjacent keto group by 0, 2 or more than 2 carbon atoms, and also containing at least one hydrogen atom in the α-position to a keto group, with aldehydes in the absence of catalysts, is advantageously carried out by effecting the reaction with aldehydes which contain, in the α-position or, via a double bond, in the γ-position to the aldehyde group, an acyl group, a carboxyl group, a carbonamide group or a carboxylate group, at a temperature below 140° C.

In the event that acetone and glyoxylic acid are used the reaction may be represented by the following equation:

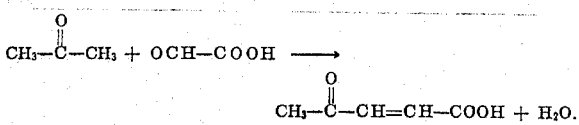

Compared with the prior art, the process of the invention surprisingly provides a large number of carbonyl compounds in good yield and purity in a simple manner. It was not to be expected that these favorable results would be obtained with ketones not carrying in the β-position to the keto group any group which substantially activates the condensation. It is also surprising that resinous condensation products polymers or decomposition products are not formed to any great extent even with prolonged reaction times. The fact that this process produces high yields of the desired product at relatively low temperatures compared with the prior art could not have been predicted and is of great economic interest.

Ketones which are suitable for use in the process of the invention are aliphatic, cycloaliphatic, araliphatic, aromatic and heterocyclic ketones containing one keto group or a number of keto groups each of which is separated from the adjacent keto group by 0, 2 or more than 2 carbon atoms and also containing at least one hydrogen atom in the α-position to a keto group. Preferred ketones are those of the general formula

in which $R^1$, $R^2$ and $R^3$ may be identical or different and each denotes alkyl of from 1 to 30, preferably from 1 to 6, carbon atoms, alkenyl of from 2 to 6 carbon atoms, cycloalkyl or cycloalkenyl each of from 5 to 8 carbon atoms, aralkyl of from 7 to 12 carbon atoms, phenyl or naphthyl and $R^2$ and/or $R^3$ may also each stand for a hydrogen atom, or $R^2$ and $R^1$ may, together with the two carbon atoms adjacent to them, form members of a saturated or unsaturated 5- or 6-membered ring which may also contain a nitrogen atom, a sulfur atom or an oxygen atom and/or which may be fused with one or more saturated and/or unsaturated 5- or 6-membered rings, or in which $R^1$ may also stand for the radical of the formula

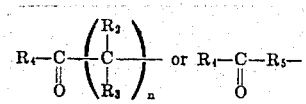

in which $R^2$ and $R^3$ have the meanings given above, $R^4$ denotes alkyl or alkoxy each of from 1 to 6 carbon atoms, hydroxyl, phenyl, cycloalkyl of from 5 to 8 carbon atoms or aralkyl of from 7 to 12 carbon atoms, n denotes 0, 2 or an integer greater than 2 and $R^5$ denotes phenylene or alkylene of from 2 to 6 carbon atoms. The said radicals may be substituted by groups which are inert under the reaction conditions, for example alkyl of from 1 to 3 carbon atoms, carbalkoxy or acyloxy each of from 2 to 6 carbon atoms, cyano or chlorine atoms.

Examples of suitable ketones are acetone, methylethyl ketone, methyl-n-propyl ketone, diethyl ketone, hexanone-2, methyl-t-butyl ketone, di-n-butyl ketone, di-n-amyl ketone, cyclohexanone, acetophenone, α-acetylnaphthalene, 4-pyranone, α-indanone, β-indanone, cyclohexylethyl ketnone, norbornylmethyl ketone, benzylmethyl ketone, diacetylbenzene, cyclohexanone-4, N-methylpiperidone-4, methylbuten-3-yl ketone, androsterone acetate, methyl o-acetylbenzoate.

The ketone is reacted with the aldehyde in stoichiometric amounts or with an excess of one component over the other, preferably with an excess of up to 10 moles of ketone per mole of aldehyde. Where the ketone possesses free hydrogen atoms in the α- or α'-positions, it is usual to use an excess of ketone in order to obtain the product of the reaction with one aldehyde group per keto group in good yields. If asymmetrically substituted ketones are used, there will generally be two different products, of which the thermodynamically more stable product will be obtained in higher yields. The use of ketones having a number of carbonyl groups usually leads to the formation of a number of products in various yields. The proportion of any given compound may often be influenced by varying the concentrations or the temperatures.

Other starting materials used are aldehydes in the form of derivatives of glyoxylic acid or in the form of aliphatic, cycloaliphatic, araliphatic, aromatic or heterocyclic α-keto aldehydes and their vinylogs. Preferred aldehydes are those of the general formula

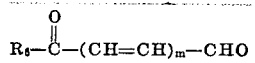   II.

in which m is equal to zero or 1 and $R^6$ stand for hydroxyl, alkyl of from 1 to 30, preferably from 1 to 6, carbon atoms, alkenyl of from 2 to 20, preferably from 2 to 6, carbon atoms, cycloalkyl of from 5 to 8 carbon atoms, aralkyl of from 7 to 12 carbon atoms, phenyl, a heterocyclic radical, preferably a 5- or 6-membered heterocyclic ring, which may contain a nitrogen atom, a sulfur atom and/or an oxygen atom and which may be fused to a benzene nucleus, the radical of the formula

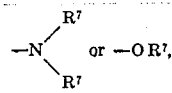

wherein $R^7$ stands for a hydrogen atom, alkyl of from 1 to 5 carbon atoms, cyclohexyl, benzyl or phenyl, or in which $R^6$ stands for a hydrogen atom when $m$ is equal to 1. The said radical may be substituted by groups which are inert under the reaction conditions, for example alkyl of from 1 to 3 carbon atoms, carbalkoxy or acyloxy each of from 2 to 6 carbon atoms, cyano or chlorine atoms.

Examples of suitable aldehydes are glyoxylic acid, butyl glyoxylate, malealdehydic acid, the isopropyl, cyclohexyl, benzyl and phenyl esters of maleic monoaldehyde, similarly N-substituted maleic monoaldehyde monocarboxamides, 4-phenyl-2-buten-4-on-al, 4-ethyl-, 4-cyclohexyl-, 4-N-methylindolyl-, 4-isopropyl- and 4-benzyl-2-buten-4-on-als, phenylglyoxal, thiophenylglyoxal and isobutylglyoxal.

Preferred products are those of the general formula

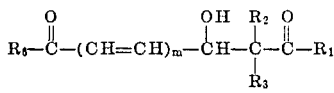   III and/or

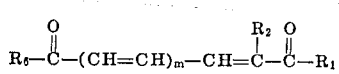   IV.

in which $R^1$ to $R^3$, $R^6$ and m have the meanings given above.

According to the starting materials used, the main products of the process of the invention are β-hydroxy carbonyl compounds or α-unsaturated carbonyl compounds, the latter being formed from the corresponding initially formed β-hydroxy compounds by the elimination of water. In general, when the reaction is carried out at lower temperatures, for example below 120° C, or with shorter reaction times, for example up to 60 minutes, the product of formula III is predominantly formed; at higher temperatures, for example between 120° and 140° C, or with longer reaction times, for example more than 2 hours, the product of formula IV is predominantly formed. At temperatures and/or reaction times between the values stated there are obtained mixtures of the products of formulae III and IV. Water is particularly readily eliminated under the influence of acidic starting materials such as glyoxylic acid.

The reaction is carried out at a temperature below 140° C, particularly between 60° and 130° C, preferably between 100° and 125° C, and at atmospheric, subatmospheric or superatomspheric pressure, continuously or batchwise. With starting materials having low boiling points, we prefer to use pressures of from 3 to 200, particularly of from 3 to 20 atmospheres. Where aldehydes or ketones are used which have boiling points above 100° C, the reaction is conveniently carried out at subatmospheric pressure, for example at between 100 and 300 mm of Hg, the water formed during the reaction being removed under mild conditions. If desired, organic solvents which are inert under the reaction conditions may be used, examples being aromatic hydrocarbons such as benzene, aliphatic hydrocarbons such as heptane or octane, chlorinated hydrocarbons such as ethyl chloride or chloroform, ethers such as dibutyl ether, or mixtures thereof.

The reaction may be carried out as follows: A mixture of the two starting materials, if desired together with solvent, is maintained at the temperature of reaction for from 30 minutes to 10 hours. The product is then isolated from the reaction mixture in the usual way, for example by removing the solvent and/or any excess starting material, extracting the residue, for example with ether, and recrystallizing the extracted residue, for example with ether, from a suitable solvent such as benzene. The reaction mixture obtained from the reaction with glyoxylic acid may, if desired, be diluted with a solvent such as diethyl ether or benzene, the mixture thus obtained being extracted with an aqueous sodium bicarbonate solution and the product being precipitated from the extract with acid. The product is then extracted for example with ether and purified and isolated in the manner described above.

In continuous operation, the reaction mixture is pumped into the reactor and the pressure which results is then maintained by means of a valve. This method is particularly preferred when an excess of starting material or a solvent has to distilled off. The mixture leaving the reactor can then be flashed into a column.

Some of the compounds produced by the process of the invention are solvents and valuable starting materials for the manufacture of dyes, plastics, adhesives and varnishes. The laevulic acid obtained from acetylacrylic acid by hydrogenation is used for the preparation of diphenolic acid which is a useful monomer for making plastics. The unsaturated dicarbonyl compounds may also be used as comonomers. For uses of these compounds see Ullmanns Enzyklopädie der technischen Chemie, Vol. 9, pp. 544 ff.

In the following Examples the parts are by weight.

EXAMPLE 1

Acetylacrylic acid 148 parts of a 50 percent by weight aqueous glyoxylic acid solution are freed from water in a rotary evaporator at subatmospheric pressure. The residue (74 parts) is taken up in 290 parts of acetone and the mixture is heated at 120° C at a pressure of 8 atmospheres for 3 hours. The excess acetone is distilled off. The residue (129 parts) extracted 5 times with 100 parts of ether each time, and the extract is dried over sodium sulfate and concentrated. The extract (95 parts) is recrystallized from benzene to give 87 parts of acetylacrylic acid, m.p. 125°–126°C (76 percent of theory based on glyoxylic acid).

EXAMPLES 2

Benzoylacrylic acid 180 parts of an 80 percent by weight aqueous glyoxylic acid solution are heated with 240 parts of acetophenone at 125° C for 5 hours, the water of reaction being distilled off. The reaction mixture is diluted with 500 parts of ether and extracted with 1,000 parts of a 20 percent by weight aqueous sodium bicarbonate solution. The extract is treated with dilute sulfuric acid to precipitate the benzoylacrylic acid formed, which is extracted with ether. The ethereal solution is dried and concentrated and the residue recrystallized from benzene. 301 parts (86 percent of theory) of benzoylacrylic acid, m.p. 94°–96° C, are obtained.

EXAMPLE 3

2-(2'-Oxocyclohexylidene)acetic acid

In the manner described in Example 1, 175 parts of 80 percent by weight glyoxylic acid and 265 parts of cyclohexanone are reacted for 4 hours at 120° C. The excess cyclohexanone is distilled off at subatmospheric pressure and the residue is worked up as described in Example 1. The yield of 2-(2'-oxocyclohexylidene)acetic acid is 214 parts (73.5 percent of theory based on glyoxylic acid). 114 parts of cyclohexanone are recovered, so that the yield of product based on cyclohexanone is 90 percent of theory. The product is a mixture of the appropriate cis and trans compounds (m.p. 90°–91° or 125°–126° C).

EXAMPLE 4

1,4-Diphenylbutan-1,4-dion-2-ol 134 parts of phenylglyoxal are heated with 720 parts of acetophenone at 130° C for 4 hours. The excess acetophenone is distilled off at subatmospheric pressure and the residue (251 parts) is recrystallized from benzene. There are thus obtained 228 parts (89 percent of theory) or 1,4-diphenylbutan-1,4-dion-2-ol, m.p. 93°–93° C.

EXAMPLE 5

1-Phenylpentan-1,4-dion-2-ol

In an autoclave phenylglyoxal (67 parts) and acetone (580 parts) are heated at 120° C for 5 hours. The acetone is then distilled off and the residue fractionally distilled. The fraction boiling at 130°–140° C/0.5 mm (89 parts) is recrystallized from carbon tetrachloride. There are thus obtained 81.5 parts (85 percent of theory) of 1-phenylpentan-1,4-dion-2-ol, m.p. 60°–61°C.

EXAMPLE 6

1-Benzoylbutadien-4-oic acid 100 parts of malealdehydic acid and 120 parts of acetophenone are heated for 10 hours, the water of reaction being distilled off. At the end of this period 6 parts of water have separated. The excess acetophenone is distilled off at subatmospheric pressure and the residue (141 parts) is extracted with carbon tetrachloride. The extract is concentrated and recrystallized from chloroform. There are thus obtained 28 parts of 1-benzoylbutadien-4-oic acid, m.p. 161°–163°C. The yield is 35 percent of theory based on acetophenone.

EXAMPLE 7

1,4-Dibenzoylbutadiene 8 parts of benzoylacrolein are heated with 24 parts of acetophenone at 130° C for 4 hours. The excess acetophenone is distilled off at subatmospheric pressure and the residue is recrystallized from carbon tetrachloride. There are thus obtained 5 parts of 1,4-dibenzoylbutadiene, m.p. 61°–64° C, equivalent to a yield of 38 percent of theory based on benzoylacrolein.

EXAMPLE 8

4-Oxohepta-2,5-dien-1,7-dioic acid 114 parts of acetylacrylic acid are dissolved in 250 parts of tetrahydrofuran and heated with 74 parts of anhydrous glyoxylic acid at 120° C for 3.5 hours. On cooling, a portion of the product crystallizes out. The remainder is precipitated from the solution when it is concentrated to half its volume. The product is recrystallized from a 1:2 mixture of ethanol and water and there are thus obtained 131 parts of 4-oxohepta-2,5-dien-1,7-dioic acid, m.p. 238°–239° C. The yield is 78 percent of theory based on acetylacrylic acid.

EXAMPLE 9

1-Phenyl-3-oxohexa-1,4-dien-6-oic acid 146 parts of benzalacetone and 74 parts of anhydrous glyoxylic acid are heated at 120° C for 3 hours, 18 parts of water being distilled off in vacuo. The slurry of crystals formed on cooling is recrystallized from ethyl acetate, and there are thus obtained 146 parts (76 percent of theory based on benzalacetone) of a crystalline product having a melting point of 137°–139° C. The crystalline product consists of 60 percent by weight of 1-phenyl-3-oxohexa-1,4-dien-6-oic acid and 40 percent by weight of the lactone form, i.e., 1-phenyl-3-oxo-4-hexene-1,6-lactone.

EXAMPLE 10

1,2,2',5-Tetramethyl-5-α-hydroxyacetic acid-(4-piperidone)

31 parts of 1,2,2',5-tetramethyl(4-piperidone and 25 parts of glyoxylic acid are dissolved in 200 parts of ethyl alcohol and stirred at room temperature for 12 hours. The reaction mixture is filtered and a further portion of product is obtained by concentrating the solution. The product is recrystallized from water/ethanol and there are thus obtained 59 parts (84 percent of theory based on starting material I) of a mixture having a melting point of 196°–197°C (with decomposition). The mixture consists of 90 percent by weight of 1,2,2',5-tetramethyl-5-α-hydroxyacetic acid-(4-piperidone) and 10 percent by weight of 3-(1,2,2',5-tetramethyl-4-piperidonylidene)acetic acid.

We claim:

1. A process for the manufacture of β-hydroxy carbonyl compounds and/or α-unsaturated carbonyl compounds by the reaction of ketones containing one keto group or a number of keto groups each of which is separated from the adjacent keto group by 0, 2 or more than 2 carbon atoms, and also containing at least one hydrogen atom in the α-position to a keto group, with aldehydes in the absence of catalysts, wherein the reaction is carried out with aldehydes which contain, in the α-position or, via a double bond, in the γ-position to the aldehyde group, an acyl group, a carboxyl group, a carbonamide group or a carboxylate group, at a temperature of 60°C. to 140° C.

2. A process as claimed in claim 1 wherein the reaction is carried out with an excess of up to 10 moles of ketone per mole of aldehyde.

3. A process as claimed in claim 1 wherein the reaction is carried out at a temperature of from 60° to 130° C.

4. A process as claimed in claim 1 wherein the reaction is carried out at a temperature of from 100° to 125° C.

5. A process as claimed in claim 1 wherein the reaction is carried out in the presence of an inert organic solvent.

* * * * *

UNITED STATES PATENT OFFICE
CERTIFICATE OF CORRECTION

Patent No. 3,759,929          Dated September 18, 1973

Inventor(s) Georg Klotmann and Herbert Mueller

It is certified that error appears in the above-identified patent and that said Letters Patent are hereby corrected as shown below:

First page, left-hand column, twelfth line, insert
--    30      Foreign Application Priority Data November 4, 1969     Germany . . . . . P 19 55 375.4 --

Column 3, line 55, "isobutylgyloxal" should read
-- isobutylglyoxal --.

Signed and sealed this 17th day of September 1974.

(SEAL)
Attest:

McCOY M. GIBSON JR.               C. MARSHALL DANN
Attesting Officer                  Commissioner of Patents